US005447285A

United States Patent [19]

Yokogi

[11] Patent Number: 5,447,285

[45] Date of Patent: Sep. 5, 1995

[54] SAFETY DEVICE FOR CYLINDER VALVE AUTOMATIC SWITCHING UNIT

[75] Inventor: Kazuo Yokogi, Tokyo, Japan

[73] Assignee: Teisan Kabushiki Kaisha, Tokyo, Japan

[21] Appl. No.: 210,944

[22] Filed: Mar. 21, 1994

[30] Foreign Application Priority Data

Apr. 6, 1993 [JP] Japan .................................. 5-079609

[51] Int. Cl.$^{6}$ ......................... F16K 31/12; F15B 20/00

[52] U.S. Cl. ......................................... 251/27; 60/404; 251/31; 251/58; 251/59

[58] Field of Search ....................... 60/404; 251/27, 31, 251/58, 59

[56] References Cited

U.S. PATENT DOCUMENTS 3,752,041 8/1973 Smith ................................ 251/59 X 4,872,482 10/1989 Jarrett ............................... 251/26 X

*Primary Examiner*—Gerald A. Michalsky

*Attorney, Agent, or Firm*—Oblon, Spivak, McClelland, Maier, & Neustadt

[57] ABSTRACT

The invention relates to safety device for a cylinder valve automatic switching unit, wherein said valve is automatically closed when some abnormality such as down of an air pressure takes place. A first air-operated selector valve 8 is installed which causes air flowing out of a reservoir tank 10 to flow into a second supply line 3 when air pressure is reduced, whereby a cylinder valve automatic switching unit 1 in the opening situation is caused to make a closing motion for closing a cylinder valve in the opened situation. And, a second air-operated selector valve 9 is further installed which discharges air flowing out of a first supply line 2 to the atmosphere when the air pressure is reduced.

7 Claims, 3 Drawing Sheets

SAFETY DEVICE FOR CYLINDER VALVE AUTOMATIC SWITCHING UNIT

BACKGROUND OF THE INVENTION

The present invention relates to a safety device for a cylinder valve automatic switching unit which causes a cylinder valve automatic switching unit (a double-acting, air operated rotary actuator) in the open position to make a closing motion, thereby preventing any danger.

DESCRIPTION OF THE PRIOR ART

An automatic switching unit for a cylinder valve according to the prior art is disclosed on FIG. 4. 0n this figure, a cylinder valve automatic unit 1 is able to make an opening or closing motion, with the flowing-in of air which is being fed thereto from a driving air pressure source 4 by way of an electromagnetic selector valve 5, thereby opening or closing a cylinder valve (not shown).

The aforementioned cylinder valve automatic switching unit 1 is constructed in the form of a cylinder closed in top and bottom sides, and on a portion of the inner peripheral wall thereof, a control plate 1*a* is projected in the vertical direction, which is directed to the center.

On a portion of the peripheral wall of the cylinder valve automatic switching unit 1, there are a first port 1*b* and a second port 1*c* bored so as to be projectedly juxtaposed which are of through holes. The aforementioned control plate 1*a* is mounted as it is hidden, between these first port 1*b* and second port 1*c*.

To the first port 1*b* is connected a first supply line 2 which makes a supplying operation, and to the second port 1*c* is also connected a second supply line 3 which makes the same supplying operation. These first supply line 2 and second supply line 3 are connected to the driving air pressure source 4 by way of the electromagnetic selector valve 5.

On the other hand, a turnable rotary shaft 1*d* is provided running vertically at the center of the inside of the cylinder valve automatic switching unit 1. To the bottom portion of the rotary shaft 1*d* which is hanging downward and outward is connected a cylinder valve (not shown) which stores a gas. A vane plate (vane) 1*e* which is in contact with the control plate 1*a* is attached as one body on the rotary shaft 1*d*.

This vane plate 1*e* rotates counterclockwise 270 degrees for opening when air is permitted to flow from the first port 1*b* to the inside of the cylinder valve automatic switching unit 1, whereby air between the control plate 1*a* and the vane plate 1*e* is discharged from the second port 1*c* to the second supply line 3 and the rotary shaft 1*d* is rotated in the same direction to open the cylinder valve (see: an arrowmark in FIG. 4).

The same vane plate 1*e* functions reversely to rotate clockwise 270 degrees for closing when air is permitted to flow from the second port 1*c* to the inside of the cylinder valve automatic switching unit 1, whereby air between the control plate 1*a* and the vane 1*e* is discharged from the first port 1*b* to the first supply line 2 and the rotary shaft 1*d* is rotated in the same direction to close the cylinder valve.

On the other hand, the aforementioned electromagnetic selector valve 5 functions to displace its flow path on the basis of the exciting action of a solenoid 5*a* when the cylinder valve is opened, whereby air from the driving air pressure source 4 is selectively led to the first supply line 2 and air led to the second supply line 3 is discharged to the atmosphere.

The same electromagnetic selector valve 5 functions reversely to return its flow path on the basis of the resilient biasing action of a spring 5*b* in the compressed situation when the cylinder valve is closed, whereby air from the driving air pressure source 4 is led selectively to the second supply line 3 and air led to the first supply line 2 is discharged to the atmosphere.

To open the cylinder valve, the solenoid 5*a* of the electromagnetic selector valve 5 is energized to displace its flow path to the upper direction of FIG. 4 so that is led from the driving air pressure source 4 to the first supply line 2.

Then, air is caused to flow to the inside of the cylinder valve automatic switching unit 1 by way of the driving air pressure source 4, electromagnetic selector valve 5, first supply line 2 and first port 1*b* in turn, whereby the vane plate 1*e* shown in FIG. 4 is counterclockwise rotated 270 degrees for opening.

After the vane plate 1*e* has been rotated for opening, the cylinder valve is opened and air between the vane plate 1*e* and control plate 1*a* is discharged from the second port 1*c* to the second supply line 3, and the air is then discharged from the electromagnetic selector valve 5 to the atmosphere.

To close the cylinder valve, the solenoid 5*a* is deenergized to return the flow path to the electromagnetic selector valve 5 to the position shown in FIG. 4 on the basis of the resilient biasing action of the spring 5*b* so that air is led from the driving air pressure source 4 to the second supply line 3.

Then, air is caused to flow to the inside of the cylinder valve automatic switching unit 1 by way to the driving air pressure source 4, electromagnetic selector valve 5, second supply line 3 and second port 1*c* is turn, whereby the vane plate 1*e* is clockwise rotated 270 degrees for closing.

After the vane plate 1*e* has been rotated for closing, the cylinder valve is closed and air between the vane plate 1*e* and control plate la is discharged from the first port 1*b* to the first supply line 2, and the air is then discharged from the electromagnetic selector valve 5 to the atmosphere.

In any case of the opening motion and closing motion as mentioned above, namely, driving air is indispensable for the cylinder valve automatic switching unit 1.

SUMMARY OF THE INVENTION

For the cylinder valve automatic switching unit disclosed hereabove, driving air is indispensable in any case of the opening motion and closing motion because it is so constructed as mentioned above. When some abnormality such breaking of a driving air line takes place as the cylinder valve is opened, the cylinder valve automatic switching unit can not make a closing motion because of no supply of driving air. Accordingly, when some abnormality takes place, there is a risk that the cylinder valve can not be closed automatically which may be an important concern, particularly when the cylinder contains chemical and/or flammable gases.

It is an object of the present invention to provide a safety device for a cylinder valve automatic switching unit, which can surely cause the cylinder valve automatic switching unit to make a closing motion, thereby improving the safety remarkably, even when some abnormality such as down of the air pressure takes place.

In order to achieve the aforementioned purpose in the present invention, the safety device for a cylinder valve automatic switching unit comprises: a cylinder valve automatic switching unit for opening or closing a cylinder valve; a first conduit means, through which a fluid from a fluid supply source is caused to flow into a first port of said cylinder valve automatic switching unit to make an opening motion; a second conduit means, through which the fluid from the fluid supply source is caused to flow into a second port of said cylinder valve automatic switching unit, thereby causing the same cylinder valve automatic switching unit to make a closing motion; a first selector valve for leading the fluid from the fluid supply source selectively to the first conduit means or second conduit means, and for discharging the fluid led to the second conduit means or first conduit means to the atmosphere; a second selector valve for permitting on normal operation the flow of the fluid between the second conduit means and the first selector valve on the basis of the fluid pressure coming from the fluid supply source, and for causing the fluid flowing out of a storage means to flow into the second fluid port when the fluid pressure is reduced, whereby the cylinder valve automatic switching unit in the opening situation is caused to make a closing motion; and a third selector valve for permitting on normal operation the flow of the fluid between the first conduit means and the first selector valve on the basis of the fluid pressure coming from the fluid supply source, and for discharging the fluid flowing out of the first fluid port to the atmosphere when the fluid pressure is reduced.

When some abnormality such as breaking of a driving air line takes place as a cylinder valve is opened, according to the present invention having the aforementioned construction, the pressure of a fluid from a fluid supply source is reduced so that a second selector valve and third selector valve which have been displaced are returned and the fluid accumulated in a storage means is supplied to the second selector valve.

Then the fluid is caused to flow from the second selector valve to a second conduit means and to flow to the inside of a cylinder valve automatic switching unit so that same cylinder valve automatic switching unit is caused to make a closing motion, thereby closing the cylinder valve. The fluid is caused to flow from a first fluid port to the third selector valve with the closing motion of the cylinder valve automatic switching unit, and it is then discharged from the third selector valve to the atmosphere.

BRIEF DESCRIPTION OF THE DRAWINGS

Figure 1:
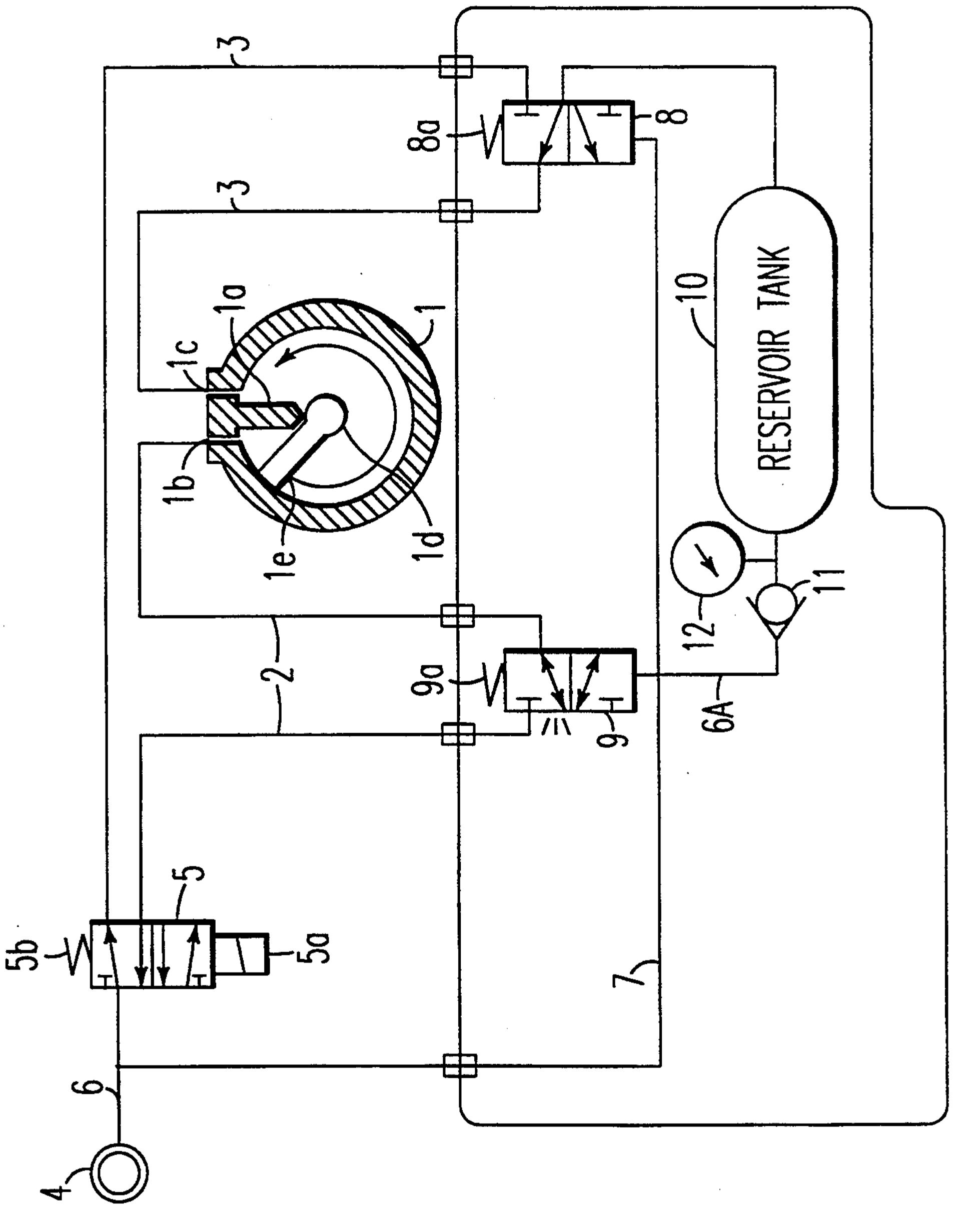
FIG. 1 is a cross-sectional view showing one embodiment of a safety device for a cylinder valve automatic switching unit according to the present invention.

On the various FIGS. 1 to 4, the reference numerals have the following meaning:

1.1A.1B—cylinder valve automatic switching unit, 1*b*—first port (first fluid port), 1*c*—second port (second fluid port), 1*d*—rotary shaft, 1*e*—vane plate, 2—first supply line (first conduit means), 3—second supply line (second conduit means), 4—driving air pressure source (fluid supply source), 5—electromagnetic selector valve (first selector valve), 7—third supply line, 8—first air-operated selector valve (second selector valve), 9—second air-operated selector valve (third selector valve), 10—reservoir tank (storage means).

DETAILED DESCRIPTION OF THE INVENTION

Referring to a first embodiment shown in FIG. 1 the present invention is described in detail hereunder:

The safety device for a cylinder valve automatic switching unit according to the present invention comprises a first air-operated selector valve 8 for causing a cylinder valve automatic switching unit 1 in the opening situation to make a closing motion when some abnormality takes place, and a second air-operated selector valve 9 for discharging air flowing out of a first port 1*b* to the atmosphere when some abnormality takes place.

The aforementioned cylinder valve automatic switching unit 1 is constructed in the form of a cylinder closed in top and bottom sides and a portion of the inner peripheral wall thereof, a control plate 1*a* is projected in the vertical direction, which is directed to the center.

On a portion of the peripheral wall of the cylinder valve automatic switching unit 1, a first port (first fluid port) 1*b* and a second port (second fluid port) 1*c* are bored and projectedly juxtaposed which are of through holes. The aforementioned control plate 1*a* is mounted as it is hidden between these first and second ports 1*b* and 1*c*.

To the first port 1*b* is connected a first supply line (first conduit means) 2 which makes a supplying operation, and to the second port 1*c* is also connected a second supply line (second conduit means) 3 which makes the same supplying operation. These first supply line 2 and second supply line 3 are connected to a driving air pressure source (fluid supply source) 4 by way of an electromagnetic selector valve (first selector valve) 5.

On the other hand, a turnable rotary shaft 1*d* is provided running vertically at the center of the inside of the cylinder valve automatic switching unit 1. To the bottom portion of the rotary shaft 1*d* which is hanging downward and outward is connected a cylinder valve (not shown) which stores a gas. A vane plate (vane) 1*e* which is obliquely in contact with the control plate 1*a* is attached as one body on the rotary shaft 1*d*.

This vane plate 1*e* functions to rotate counterclockwise 270 degrees for opening when air (fluid) is permitted to flow the first port 1*b* to the inside of the cylinder valve automatic switching unit 1, whereby air between the control plate 1*a* and the vane plate 1*e* is discharged from the second port 1*c* to the second supply line 3 and the rotary shaft 1*d* is rotated in the same direction to open the cylinder valve (see: an arrowmark in FIG. 1).

The same valve 1*e* functions reversely to rotate clockwise 270 degrees for closing when air is permitted to flow from the second port 1*c* to the inside of the cylinder valve automatic switching unit 1, whereby air between to control plate 1*a* and the vane plate 1*e* is discharged from the first port 1*b* to the first supply line 2 and the rotary shaft 1*d* is rotated in the same direction to close the cylinder valve.

On the other hand, the aforementioned electromagnetic selector valve 5 functions to displace its flow path on the basis of the exciting action of a solenoid 5*a* when the cylinder valve is open, whereby air from the driving air pressure source 4 is selectively led to the first supply line 2 and air led to the second supply line 3 is discharged to the atmosphere.

The same electromagnetic selector valve 5 functions reversely to return its flow path on the basis of the resilient biasing action of a spring 5*b* in the compressed situation when the cylinder valve is closed, whereby air from the driving air pressure source 4 is selectively led to the second supply line 3 and air led to the first supply line 2 is discharged to the atmosphere.

To a line 6 connecting the driving air pressure source 4 and the electromagnetic selector valve 5 is connected a third supply line 7 for supplying air, and to this third supply line 7 are connected a first air-operated selector valve (second selector valve) 8 and a second air-operated selector valve (third selector valve) 9, respectively.

This first air-operated selector valve 8 is connected with a portion of the second supply line 3, as shown in FIG. 1 and it functions to return its flow path on the basis of the resilient biasing action of a spring 8*a* in the compressed situation when the air pressure is reduced, so that air flowing out of a reservoir tank (storage means) 10, which will be mentioned below, is caused to flow into the second supply line 3, whereby the cylinder valve automatic switching unit 1 in the opening situation is caused to make a closing motion.

The second air-operated selector valve 9 is connected with a portion of the first supply line 2, as shown in FIG. 1, and it functions on normal operation to displace its flow path on the basis of the air pressure coming from the driving air pressure source 4, whereby the flow of air between the first supply line 2 and the electromagnetic selector valve 5 is permitted The same second air-operated selector valve 9 functions to return its flow path on the basis of the resilient biasing action of a spring 9*a* in the compressed situation when the air pressure is reduced; whereby air led to the first supply line 2 is discharged to the atmosphere.

Moreover, to the aforementioned line 6 is connected the reservoir tank 10 for storing air by way of a line 6A. This reservoir tank 10 is made up of a tank whose inside is hollow, and it possesses the function of supplying the stored air to the first air-operated selector valve 8 when the air pressure is reduced.

In addition, on the line 6A for supplying air to the reservoir tank 10, a check valve 11 is connected for preventing the reduction of the air pressure on malfunction, and a pressure gauge 12 is installed for monitoring the air pressure in the line 6A.

Next, the operation of the safety device for a cylinder valve automatic switching unit will be described. When it is wanted to open the cylinder valve, it will be satisfactorily carried out by exciting the solenoid 5*a* of the electromagnetic selector valve 5 to displace its flow path to the upper direction of FIG. 1 so that air is led from the driving air pressure source 4 to the first supply line 2.

Then, air is caused to flow to the inside of the cylinder valve automatic switching unit 1 by way of the driving air pressure source 4, electromagnetic selector valve 5, second air-operated selector valve 9, first supply line 2 and first port 1*b* in turn, whereby the vane plate 1*e* shown in FIG. 1 is counterclockwise rotated 270 degrees for opening.

After the vane plate 1*e* has been rotated for opening, the cylinder valve is opened with the rotation of the rotary shaft 1*d* and air between the vane 1*e* and control plate 1*a* is discharged from the second port 1*c* to the second supply line 3 by way of the first air-operated selector valve 8 and the air is then discharged from the electromagnetic selector valve 5 to the atmosphere.

And, when it is wanted to close the cylinder valve, it will be satisfactorily carried out by de-exciting the solenoid 5*a* to return the flow path of the electromagnetic selector valve 5 to the position shown in FIG. 1 on the basis of the resilient biasing action of the spring 5*b* so that air is led from the driving air pressure source 4 to the second supply line 3.

Then, air is caused to flow to the inside of the cylinder valve automatic switching unit 1 by way of the driving air pressure source 4, electromagnetic selector valve 5, first air-operated selector valve, second supply line 3 and second port 1*c* in turn, whereby the vane plate 1*e* shown is clockwise rotated 270 degrees for closing.

After the vane plate 1*e* has been rotated for closing, the cylinder valve is closed with the rotation of the rotary shaft 1*d* and air between the vane plate 1*e* and control plate 1*a* is discharged from the first port 1*b* to the first supply line 2 by way of the second air-operated selector valve 9, and the air is then discharged from the electromagnetic selector valve 5 to the atmosphere.

On these normal operations, the first air-operated selector valve 8 and second air-operated selector valve 9 displace their flow paths to the upper direction of FIG. 1 on the basis of the air pressure coming from the driving air pressure source 4, whereby the flow of air between the first supply line 2 and the electromagnetic selector valve 5 is permitted and the flow of air between the second supply line 3 and the electromagnetic selector valve 5 is also permitted.

When some abnormality such a breaking of the driving air line takes place as the cylinder valve is opened, on the contrary, the air pressure coming from the driving air pressure source 4 is inevitably reduced, whereby the displaced situations of the first air-operated selector valve 8 and second air-operated selector valve 9 air released.

Then, the flow paths of the first air-operated selector valve 8 and second air-operated selector valve 9 are automatically returned on the basis of the resilient biasing actions of the springs 8*a*, 9*a* and air accumulated in the reservoir tank 10 is supplied to the first airoperated selector valve 8.

The supplied air is caused to flow from the first airoperated selector valve 8 into the second port 1*c* by way of the second supply line 3 and to flow to the inside of the cylinder valve automatic switching unit 1, whereby the vane plate 1*e* is clockwise rotated 270 degrees for closing and the cylinder valve is closed with this rotation of the rotary shaft 1*d*.

After the vane plate 1*e* has been rotated for closing, air between the vane plate 1*e* and control plate 1*a* is caused to flow from the first port 1*b* to the second air-operated selector valve 9 by way of the first supply line 2, and then discharged from this second air-operated selector valve 9 to the atmosphere.

In case the cylinder valve has been close, in addition, the aforementioned safety device does not operate because the safety is already secured.

According to the aforementioned construction, the first air-operated selector valve 8 and the second air-operated selector valve 9 perform the so-called fail-safe function when some abnormal event such as breaking of the driving air line takes place, depending upon earthquake or the like. Regardless of the presence of electric power of electric signals, the cylinder valve in the opened situation can be therefore closed surely by a simple construction, with avoiding danger, and an improvement in safety can be expected.

Figure 2:
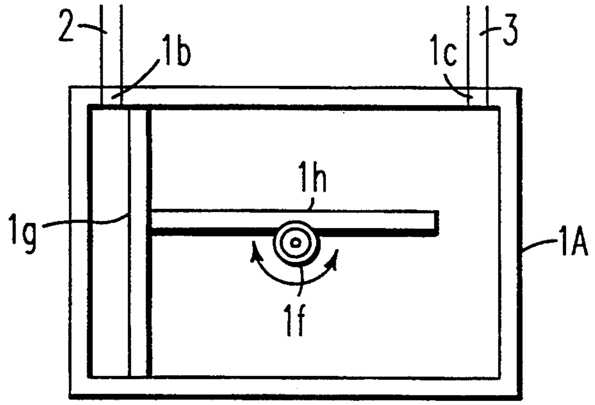
FIG. 2 is an illustrative view showing the critical part of another embodiment of a safety device for a cylinder valve automatic switching unit according to the present invention.
Figure 3:
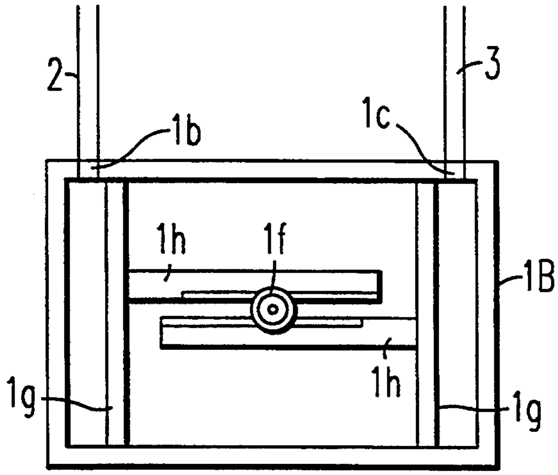
FIG. 3 is an illustrative view showing the critical part of a further embodiment of a safety device for a cylinder valve automatic switching unit according to the present invention.
Figure 4:
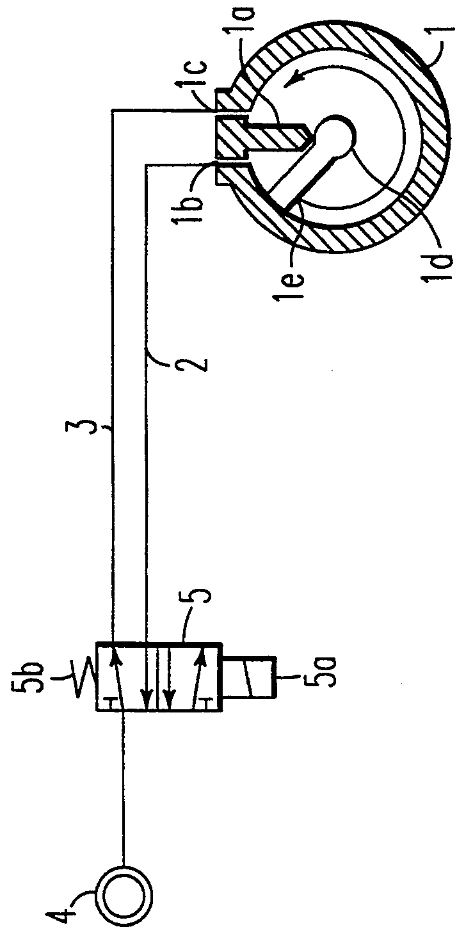
FIG. 4 is a cross-sectional view showing a system of a cylinder valve automatic switching unit according to the prior art.

Although the safety device using the cylinder valve automatic switching unit 1 which rotates the vane in one direction with the flowing of air therein has be described in the aforementioned embodiment, such a cylinder valve automatic switching unit 1A, 1B as shown in FIG. 2 or FIG. 3 may be used.

Namely, the cylinder valve automatic switching unit 1A shown in FIG. 2 is constructed in the form of a box having a first port 1*b* and a second port 1*c* which are through holes, and at the center of the inside thereof, a rotatable pinion if is journalled. A rack 1*h* of a sliding plate 1*g* which slides right and left in FIG. 2 is horizontally engaged with the upper portion of said pinion 1*f*. The other parts and motion are the same as in the aforementioned embodiment.

Furthermore, the cylinder valve automatic switching unit 1B shown in FIG. 3 is constructed in the form of a box having a first port 1*b* and a second port 1*c* which are through holes, and at the center of the inside thereof, a rotatable pinion 1*f* is journalled. Racks 1*h* of a pair of sliding plates 1*g* which slide right and left in FIG. 3 are horizontally engaged with the upper and under portions of said pinion 1*f*, respectively. The other parts and motion are the same as in the aforementioned embodiment.

Even if these cylinder valve automatic switching units 1A, 1B are used, there can be obviously obtained the same operational effects as in the aforementioned embodiment.

It goes without saying that cylinder valve automatic switching units having another structure other than the aforementioned structure can be used, so long as they have the same function as the aforementioned cylinder valve automatic switching units 1, 1A, 1B.

Although the safety device using a fluid comprising air has been described in the aforementioned embodiments, there is no limitation thereto. Even if nitrogen or oil pressure is used, there can be obtained the same operational effects as in the aforementioned embodiment.

Although a cylinder valve opening and closing unit has been described as the cylinder valve automatic switching unit in the aforementioned embodiments, it is a matter of course that an automatic switching unit can be adapted to open and close a valve other than the cylinder valve.

Owing to the fact that both the second selector valve and third selector valve perform the fail-safe function, as mentioned above, according to the present invention, there are obtained such remarkable effects that the cylinder valve in the opened situation can be surely closed and a conspicuous improvement in safety can be expected by virtue of the secure closing, for instance even when some abnormality such as breaking of the driving air line takes place.

I claim:

1. A safety device for a cylinder valve automatic switching unit, which comprises:

a) a cylinder valve automatic switching means for opening or closing a cylinder valve means;

b) a first conduit means, in fluid connection with said cylinder valve automatic switching means, through which a fluid from a fluid supply source is caused to flow into a first fluid port of said cylinder valve automatic switching means, thereby causing the same switching means to make an opening motion;

c) a second conduit means, also in fluid connection with said cylinder valve automatic switching means, through which a fluid from a fluid supply source is caused to flow into a second fluid part of said cylinder valve automatic switching means, thereby causing the same switching means to make a closing motion;

d) a first selector valve means in fluid connection with a fluid supply source and each of said first and second conduit means, for flowing fluid from said fluid supply source selectively either to said first conduit means or said second conduit means, and for discharging the fluid led to the second conduit means or first conduit means to the atmosphere;

e) a second selector valve means, in fluid connection with said first selector valve means, said cylinder valve automatic switching means and a storage means, for permitting on normal operation the flow of the fluid between the second conduit means and the first selector valve on a basis of a pressure of the fluid coming from the fluid supply source, and for causing the fluid flowing out of said storage means to flow into the second fluid port when the fluid pressure is reduced, whereby the cylinder valve automatic switching means in the opening position is caused to make a closing motion;

f) a third selector valve means, in fluid connection with said first selector valve means, said cylinder valve automatic switching means and said storage means, for permitting on normal operation the flow of the fluid between the first conduit means and the first selector valve means on the basis of a fluid pressure coming from the fluid supply source, and for discharging the fluid flowing out of the first fluid port to the atmosphere when the fluid pressure is reduced; and g) storage means.

2. The safety device of claim 1, wherein said cylinder valve automatic switching unit is in a form of a cylinder which is closed in top and bottom sides, and in a portion of an inner peripheral wall thereof, and having a control plate projected in a vertical direction toward the center of said unit.

3. The safety device of claim 2, which further comprises a vane plate which is obliquely in contact with said control plate, and which is attached on a rotary shaft which hangs downward and outward and which is connected to a cylinder valve.

4. The safety device of claim 1, wherein said first and second fluid ports are projected juxtaposed and bored through a portion of a peripheral wall of the cylinder valve automatic switching unit.

5. The safety device of claim 1, wherein said first selector valve means is an electromagnetic selector valve.

6. The safety device of claim 1, wherein said cylinder valve automatic switching unit is in a form of a box having first and second port through holes, with a rotatable pinion journalled at the center of said unit, wherein a rack of a sliding plate, which is able to slide right and left, is horizontally engaged with an upper portion of said pinion.

7. The safety device of claim 2, wherein said cylinder valve automatic switching unit is in a form of a box having first and second port through holes, with a rotatable pinion journalled at the center of said unit, wherein racks of a pair of sliding plates, which are able to slide right and left, are horizontally engaged with upper and lower portions of said pinion.

* * * * *